United States Patent [19]

Ooraikul et al.

[11] Patent Number: 4,582,710

[45] Date of Patent: Apr. 15, 1986

[54] SYNTHETIC FOOD PRODUCT

[75] Inventors: Buncha Ooraikul; Nathan Y. Aboagye, both of Edmonton, Canada

[73] Assignee: The Governors of the University of Alberta, Edmonton, Canada

[21] Appl. No.: 709,607

[22] Filed: Mar. 7, 1985

[51] Int. Cl.$^4$ .................. A23L 1/216; A23L 1/04; A23J 3/02

[52] U.S. Cl. .................. 426/104; 426/573; 426/575; 426/277; 426/138

[58] Field of Search .......... 426/104, 573, 575, 138, 426/277, 279, 282, 297, 803, 804, 574, 580, 582

[56] References Cited

U.S. PATENT DOCUMENTS

| | | | |
|---|---|---|---|
| 3,362,831 | 1/1968 | Szczesniak | 426/104 |
| 3,726,693 | 4/1973 | Harris | 426/89 |
| 3,962,482 | 6/1976 | Comer et al. | 426/575 |
| 4,089,981 | 5/1978 | Richardson | 426/804 |
| 4,143,163 | 3/1979 | Hutchison | 426/96 |
| 4,348,418 | 9/1982 | Smith et al. | 426/104 |
| 4,375,481 | 3/1983 | Kuwabara et al. | 426/575 |

*Primary Examiner*—Raymond N. Jones
*Assistant Examiner*—Carolyn Paden
*Attorney, Agent, or Firm*—Sim & McBurney

[57] ABSTRACT

A process for manufacturing an edible food product includes making a mixture of sodium alginate, sodium caseinate and carrageenan, and adding this mixture to water at a temperature high enough to bring about substantially complete dissolution. The resultant slurry is spread as a film on a surface, and heated to cause partial drying. The film is then contacted by a solution of calcium chloride so that sodium atoms in the film are replaced by calcium atoms, thus adding strength to the film.

39 Claims, No Drawings

SYNTHETIC FOOD PRODUCT

This invention relates generally to a process for manufacturing an edible food product, and the product so manufactured. In a particular application of this invention, the edible food product can be used to replace the well-known potato skin shells which are typically stuffed with mashed or pre-garnished potato, frozen, and sold as quick prepared stuffed potato.

BACKGROUND OF THIS INVENTION

It is known to use certain kinds of thin casings for sausages and the like, these being normally made from extruded tubes of film plastics, or cleaned animal intestines. Other casings are the thick shells or casings normally made from flour, starch and/or colloidal materials which are molded and dried or baked. An example would be ice-cream cones.

However, the baked potato shells currently available on the market are made from real baked potatoes from which the content has been removed. The shells are then refilled with pre-garnished mashed potatoes, frozen and marketed as frozen baked stuffed potatoes.

The main problem with the natural baked potato shell has to do with the tediousness and expense of preparing them. Further, there is no guarantee of consistent quality or complete safety, because it often happens that bits of grit and dirt remain on the skin, despite rigorous cleaning

PRIOR PATENTS

Applicants are aware of the following prior U.S. patents of general interest to this area:

| U.S. Pat. No. | Issued | Applicant(s) |
|---|---|---|
| 2802744 | Aug. 13, 1957 | Weingand |
| 2813034 | Nov. 12, 1957 | Weingand et al |
| 3494772 | Feb. 10, 1970 | Bradshaw et al |
| 2897547 | Aug. 4, 1959 | Weingand |
| 2965498 | Dec. 20, 1960 | Hartwig et al |
| 2973274 | Feb. 28, 1961 | Langmaack |
| 3362831 | Jan. 9, 1968 | Szczesniak |
| 3493382 | Feb. 3, 1970 | Ryan et al |
| 3687688 | Aug. 29, 1972 | Stapley et al |
| 3925566 | Dec. 9, 1975 | Reinhart |
| 3962482 | June 8, 1976 | Comer et al |
| 4089981 | May 16, 1978 | Richardson |
| 4348418 | Sept. 7, 1982 | Smith et al |

The foregoing patents generally disclose the use of certain known organic materials in the manufacture of edible casings for sausages, and the like.

Some of the patents refer to the use of an alginate to make artificial food products, for example U.S. Pat. No. 3362831. Other patents refer to the preparation of an edible synthetic product incorporating glycerine, carrageenan and tapioca starch. An example is U.S. Pat. No. 3493382. The material caseinate, and specifically sodium caseinate, is disclosed in U.S. Pat. No. 3925566 in terms of its use in the preparation of a simulated meat product.

Some of the above-listed patents also discuss a process by which sodium atoms can be replaced by calcium atoms, by contacting the sodium alginate with a calcium chloride solution. An example is U.S. Pat. No. 2802744.

However, the applicants have gone beyond the various processes and formulations set forth in the prior patents, and have produced an edible food product which, though obviously adaptable to other uses in the food field, has shown itself to be ideal to provide a synthetic potato skin which has a taste and consistency very closely approximating the natural item.

GENERAL DESCRIPTION OF THE INVENTION

Although this invention will be described in the context of producing an edible film especially adapted when molded to resemble natural materials such as baked potato shell, it will be understood from what follows that the essence of the invention is not so restricted.

In essence, this invention provides a process for manufacturing an edible food product, comprising the steps:
(a) making a mixture of
    a monovalent alginate salt
    a monovalent caseinate salt
    carrageenan
(b) adding the mixture to water at a temperature high enough to bring about substantially complete dissolution, the amount of water being sufficient to create with the mixture a thick, smooth slurry,
(c) spreading the slurry as a film on a surface and heating it to a temperature elevated above room temperature to cause partial drying thereof, and
(d) contacting the film with a solution of $CaCl_2$, the proportions of the monovalent alginate salt, the monovalent caseinate salt and the carrageenan being such as to yield a product having, due to the caseinate salt, a sufficient elasticity to resist cracking upon being bent, and having, due to the carrageenan, sufficient brittleness to avoid toughness and chewiness when eaten.

This invention also includes the product itself, when manufactured by the above process.

DETAILED DESCRIPTION OF THE INVENTION

A satisfactory formula for producing an edible food product suitable for molding as instant baked potato shell is the following. Preferred weight proportions are given in the middle column. The right-hand column gives acceptable ranges for the main ingredients. Ranges in parentheses are for ingredients of secondary importance and are not critical.

| Ingredients | Parts by Weight | Preferred Range |
|---|---|---|
| A monovalent alginate salt, preferably sodium alginate | 1.5 | 0.6–2.9 |
| A monovalent caseinate salt, preferably sodium caseinate | 3.0 | 1.0–5.5 |
| Carrageenan | 0.9 | 0.6–3.0 |
| Wheat bran | 1.5 | |
| Cooking oil | 1.0 | (0.5–2.0) |
| Coloring (caramel) | 0.25 | |
| Glycerine | 1.0 | (0.5–2.0) |

The three primary and preferred materials are the first three listed, namely sodium alginate, sodium caseinate and carrageenan. All three of these materials are gelling agents which are capable of forming an aqueous slurry with water, provided the temperature of the water is high enough to cause dissolution. These three materials exhibit different degrees of crispiness and elasticity upon drying. For example, the sodium caseinate tends to have a substantial degree of elasticity, and thus resists cracking upon being bent. However, from the viewpoint of edibility, the sodium caseinate tends to be rather tough, chewy and leathery if used alone. At the other end of the scale is carrageenan, which tends to produce a rather crisp and brittle material upon drying. If used alone, it would tend to be too brittle to hold a proper shape. The sodium alginate falls somewhere between the sodium caseinate and the carrageenan in terms of these properties.

All three of these primary materials are readily available in powdered form, and it is in this form that the present invention contemplates their use.

The wheat bran suggested in the above formula is provided for its nutritional value, and for the food fiber which it contains. It is not powdered, and does not mix homogeneously with the other ingredients. It lends chewability and an attractive appearance to the final product. However, it should be considered merely as an optional additive, depending upon the degree of nutrition and fiber that is desired, and the required final appearance of the product. For these reasons, no range of parts by weight need be given.

Cooking oil is added mainly as a lubricant, since it facilitates removal from a mold, and release from a surface upon which the slurry is spread as a thin film. Any suitable edible lubricant could be utilized.

The purpose of the coloring material is self-evident. Caramel is the preferred coloring since it is a natural substance rather than an artificial one, and it does tend to give a shade of coloring similar to that of a baked potato skin. No range of parts by weight need be given.

Glycerine is added to increase the flexibility of the final product, although it may not be necessary depending upon the proportions of the first three ingredients.

The first step in the process is to mix the above ingredients thoroughly. Then, a suitable quantity of water is added with constant stirring at a temperature between about 40° C. and about 60° C., until a smooth slurry is obtained. We have found that a satisfactory slurry can be made by mixing 10 parts of the mix with 90 parts of water.

The resultant slurry is then spread or coated on a suitable surface. In the experimental work which we have carried out, the surface was provided by a glass plate, although on a production scale installation, the slurry could be coated on a moving stainless steel belt as a continuous procedure.

The material must then be heated to a temperature elevated above room temperature, to cause partial drying. We have found that heating the film on the plate to a temperature between about 90° C. and 100° C. for a period of between 35 minutes and 45 minutes is sufficient to remove most of the water added to make the slurry, and results in a unitary film which can be removed from the plate without disintegration. However, one further step is necessary in order to ensure that the film will retain its integrity when contacted with a moist filling material. This step is to contact the film with a solution of calcium chloride ($CaCl_2$), so that some of the sodium atoms in the film are replaced by calcium atoms from the calcium chloride solution. The calcium bond tends to be stronger than the sodium bond, and thus this step adds strength to the film. In particular, it has been noted that the step of contacting the film with the solution of calcium chloride allows the film to retain its integrity even when later contacted with a moist filling material.

The contact with the calcium chloride solution can be done either by dipping the film in a water bath for a given period of time, or by spraying a suitable amount of calcium chloride solution onto the film. We have found, however, that by spraying a specific weight of calcium chloride solution of a given percentage, the result of the atomic displacement process is to give a quantity of released NaCl (table salt) that is able to provide a complimentary salt taste. If there is too great a degree of atomic displacement, with a resultant large quantity of NaCl being released, the excessive salty taste may require an extra water spray for its removal. Because the degree of saltiness is dependent upon the degree of atomic displacement of sodium atoms by calcium atoms, this subsequent rinse in a water bath or a spray is regarded as optional. Where the optional additional water rinse is employed, a further drying step may also be necessary.

The next primary step is that of molding, where the film is intended to provide an article like a baked potato skin. Molding can be carried out in a mold made of aluminum or other suitable material, having a male and female part.

The molding can be done either with a room temperature mold or with a mold operated at an elevated temperature, for example 110° C. If the mold is operated at room temperature, then a subsequent drying step is required, in which the molded product can be subjected to a stream of hot air in the region of 60° C. to 80° C. for from 10 to 30 minutes. However, by the use of a mold heated to the region of 110° C., the molding and drying can take place simultaneously, and a time saving can be effected.

The intended filling material for the manufactured potato skin can be obtained by first peeling, slicing, washing and cooking potatoes that have a high dry matter content. The cooked potatoes are then mashed hot and whipped for about 2 minutes. During mashing, a small quantity of potato granules or flakes or other suitable dry material such as milk powder may be added to make the mash drier and mealier. Other materials such as salt, butter, cheese, flavorings (e.g. baked or mashed potato flavor) may be added at this stage as well. Short whipping of the mash will make its texture lighter and fluffier.

The shell is then filled with the mash, and the filling should be substantially complete so as to reduce possible shrinkage during freezing and reheating. The product may be frozen cryogenically or in a batch or continuous air-blast freezer. It is worth remarking that the freezing should be as quick as possible. Slow freezing is undesirable because it tends to create ice crystals that are too large. Then, when these crystals thaw they create sogginess in the product.

Typically, the product may be reheated in a microwave oven at a high power setting requiring about 5–7 minutes. In a regular oven at 180° C., about 15–20 minutes is required.

We have found that the reheated product has an appearance, texture and taste closely resembling those of superior baked potatoes. The present invention thus allows "baked potatoes" of a consistent quality, safety and nutrition to be produced and marketed all year round.

Our examination of the resultant product shows that it is an edible film of desirable thickness, with adequate tear-strength and elastic-strength. These two qualities may be manipulated by the length of time the film is dipped in a $CaCl_2$ solution, or by the amount of the solution sprayed on it. The film is easily molded, and its texture on chewing is very similar to the natural skin of many fruits and vegetables. It is nutritious as it contains a considerable amount of high quality protein (caseinate). It is also capable of incorporating dietary fiber, such as that provided by wheat bran. The film is useful for any products which require this type of shell for wrapping, for example cabbage rolls, egg rolls, and potato skins. Further, it could be molded into an artificial skin for other fruits or vegetables.

While one embodiment of this invention has been described hereinabove, it will be evident to those skilled in the art that changes and modifications may be made thereto, without departing from the essence of this invention as set forth in the appended claims.

The embodiments of the invention in which an exclusive property or privilege is claimed are defined as follows:

1. A process for manufacturing an edible food product, comprising the steps:
   (a) making a mixture of
      a monovalent alginate salt
      a monovalent caseinate salt
      carrageenan
   (b) adding the mixture to water at a temperature high enough to bring about substantially complete dissolution, the amount of water being sufficient to create with the mixture a thick, smooth slurry,
   (c) spreading the slurry as a film on a surface and heating it to a temperature elevated above room temperature to cause partial drying thereof, and
   (d) contacting the film with a solution of $CaCl_2$, the proportions of the monovalent alginate salt, the monovalent caseinate salt and the carrageenan being such as to yield a product having, due to the caseinate salt, a sufficient elasticity to resist cracking upon being bent, and having, due to the carrageenan, sufficient brittleness to avoid toughness and chewiness when eaten.

2. The process claimed in claim 1, in which the monovalent alginate salt is sodium alginate, and the monovalent caseinate salt is sodium caseinate.

3. The process claimed in claim 2, in which the range of parts by weight of the ingredients of said mixture is as follows:

| ingredient | range of parts by weight |
| --- | --- |
| sodium alginate | 0.6–2.9 |
| sodium caseinate | 1.0–5.5 |
| carrageenan | 0.6–3.0 |

4. The process claimed in claim 2, in which the mixture further includes a lubricant to permit ease of release from the said surface.

5. The process claimed in claim 4, in which the lubricant is cooking oil.

6. The process claimed in claim 2, in which the mixture further includes a natural substance to provide food fiber and nutritional value.

7. The process claimed in claim 6, in which the natural substance is wheat bran.

8. The process claimed in claim 2, in which the mixture further includes a food coloring agent.

9. The process claimed in claim 8, in which the food coloring agent is caramel.

10. The process claimed in claim 2, in which the sodium alginate, sodium caseinate and carrageenan are present in a weight ratio of substantially 5:10:3, respectively.

11. The process claimed in claim 10, in which the mixture further includes, for every 5 parts by weight of sodium alginate, substantially 5 parts by weight of wheat bran to provide food fiber and nutritional value, substantially from 1.7 to 6.7 parts by weight of cooking oil to provide a lubricant to aid release from the said surface, substantially 0.8 parts by weight of caramel to provide coloring, and substantially from 1.7 to 6.7 parts by weight of glycerine to increase flexibility of the film.

12. The process claimed in claim 11, in which the cooking oil is present as substantially 3.3 parts by weight, and the glycerine is present as substantially 3.3 parts by weight.

13. The process claimed in claim 2, in which the said temperature elevated above room temperature lies between about 50° C. and about 100° C.

14. The process claimed in claim 2, in which the water temperature is between about 40° C. and about 60° C.

15. The process claimed in claim 2, in which the drying of step (c) continues for between about 35 and about 45 minutes.

16. The process claimed in claim 2, in which step (d) is carried out by dipping the film in a 5% CaCl solution for between about 5 and about 10 minutes.

17. The process claimed in claim 2, in which step (d) is carried out by spraying the film with the $CaCl_2$ solution.

18. The process claimed in claim 2, in which the said temperature elevated above room temperature lies between about 50° C. and about 100° C., in which the water temperature is between about 40° C. and about 60° C., in which the drying of step (c) continues for between about 35 and about 45 minutes, and in which step (d) is carried out by dipping the film in a 5% $CaCl_2$ solution for between about 5 and about 10 minutes.

19. The process claimed in claim 2, in which the said temperature elevated above room temperature lies between about 50° C. and about 100° C., in which the water temperature is between about 40° C. and about 60° C., in which the drying of step (c) continues for between about 35 and about 45 minutes, and in which step (d) is carried out by spraying the film with the $CaCl_2$ solution.

20. The process claimed in claim 11, in which the said temperature elevated above room temperature lies between about 50° C. and about 100° C., in which the water temperature is between about 40° C. and about 60° C., in which the drying of step (c) continues for between about 35 and about 45 minutes, and in which step (d) is carried out by dipping the film in a 5% $CaCl_2$ solution for between about 5 and about 10 minutes.

21. The process claimed in claim 11, in which the said temperature elevated above room temperature lies between about 50° C. and about 100° C., in which the water temperature is between about 40° C. and about 60° C., in which the drying of step (c) continues for between about 35 and about 45 minutes, and in which step (d) is carried out by spraying the film with the $CaCl_2$ solution.

22. The process claimed in claim 2, in which the recited steps are followed by a step (e), in which the film is molded to a desired shape.

23. The process claimed in claim 22, in which step (e) is carried out in a mold heated to an elevated temperature, to effect further drying.

24. The process claimed in claim 22, in which step e) is carried out in a room-temperature mold, and is followed by a step (f), in which the molded film is dried in a stream of air at a temperature between about 60° C. and about 80° C.

25. The process claimed in claim 23, in which the said desired shape is that of a half potato, and in which the recited steps are followed by filling the shaped film with pre-prepared mashed potato, and by freezing the filled, shaped film.

26. The process claimed in claim 24, in which the said desired shape is that of a half potato, and in which the recited steps are followed by filling the shaped film with pre-prepared mashed potato, and by freezing the filled, shaped film.

27. An edible food product when prepared by the process claimed in claim 1.

28. An edible food product when prepared by the process claimed in claim 11.

29. An edible food product when prepared by the process claimed in claim 2.

30. An edible food product when prepared by the process claimed in claim 3.

31. An edible food product when prepared by the process claimed in claim 18.

32. An edible food product when prepared by the process claimed in claim 19.

33. An edible food product when prepared by the process claimed in claim 20.

34. An edible food product when prepared by the process claimed in claim 21.

35. An edible food product when prepared by the process claimed in claim 22.

36. An edible food product when prepared by the process claimed in claim 23.

37. An edible food product when prepared by the process claimed in claim 24.

38. An edible food product when prepared by the process claimed in claim 25.

39. An edible food product when prepared by the process claimed in claim 26.

* * * * *